United States Patent [19]

Ritchie

[11] Patent Number: 4,637,605
[45] Date of Patent: Jan. 20, 1987

[54] CONTROLS FOR A GAME BIKE

[76] Inventor: Frank Ritchie, 54 Prince Charles Drive, Georgetown, Ontario, Canada, L7G 3V1

[21] Appl. No.: 581,362
[22] Filed: Feb. 17, 1984
[51] Int. Cl.$^4$ ............................................. A63B 69/16
[52] U.S. Cl. ................................. 272/73; 273/148 B; 273/DIG. 28
[58] Field of Search .................................. 272/73, 69; 273/DIG. 28, 148 B; 188/24.11, 24.12

[56] References Cited

U.S. PATENT DOCUMENTS 4,235,436 11/1980 Lee ................................... 188/24.12
4,278,095 7/1981 Lapeyre ................................ 272/73

FOREIGN PATENT DOCUMENTS 2822343 11/1979 Fed. Rep. of Germany ........ 272/73

Primary Examiner—Leo P. Picard

[57] ABSTRACT

The present invention relates to a video game control arrangement in which player movement is controlled on a video screen from the handlebars of an exercise device such as a stationary exercise bicycle. The arrangement is set up such that the video controls can only be operated with a pre-set acceptable exercise level below which the controls are non-operational.

8 Claims, 10 Drawing Figures

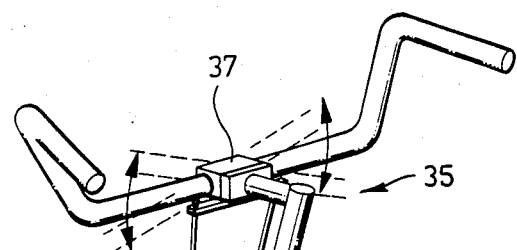
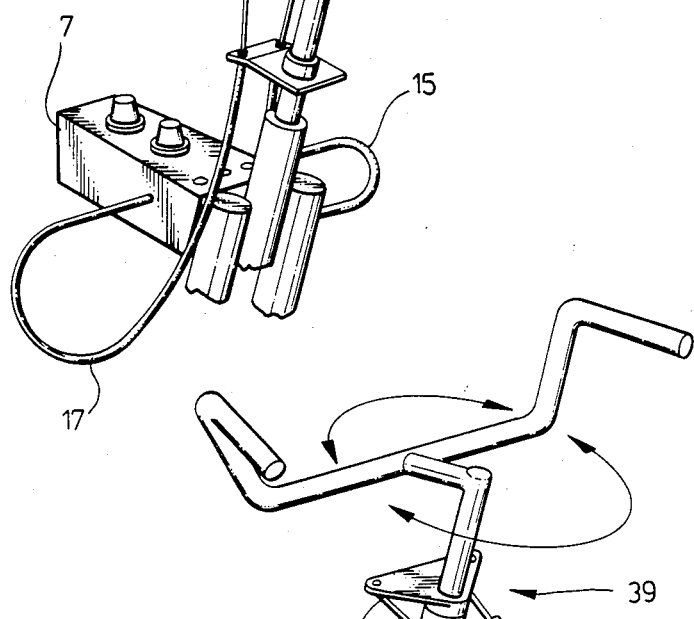
FIG. 9.
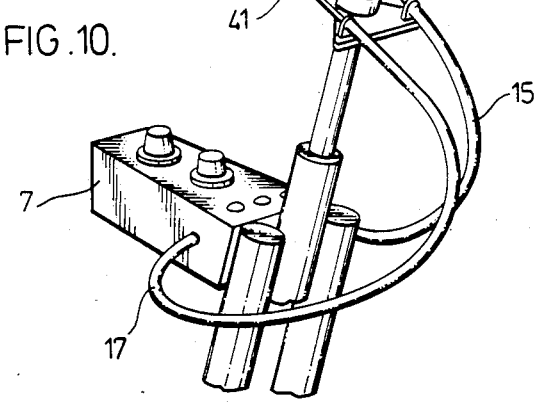
FIG. 10.

CONTROLS FOR A GAME BIKE

FIELD OF THE INVENTION

The present invention relates to a combination exercise and video game playing arrangement in which player movement on a video screen is operated by manual controls on an exercise device such as a stationary bicycle or the like. The arrangement is set up such that a preset acceptable level of exercise is required to enable operation of the controls at the exercise device.

BACKGROUND OF THE INVENTION

Although exercising has taken on a substantially increased activity over the last few years there are still relatively few people who actually enjoy the exercise and hence many people who take up exercise give it up just as quickly. For example, most people who become members at a health club will take advantage of the membership for only a short time after which they no longer use their membership.

Other examples of short term committments apply to pieces of exercise equipment such as the standard exercise bicycle or jogging machine. People who purchase these types of exercise equipment will often use them for a relatively short period and then store them in a closet from which they are seldom or ever retrieved. The reason for this is simply that most people find exercising unbearably boring since they can think of nothing other than the fact that they are having to work while performing the exercise.

Conventional exercise devices such as stationary bikes and joggers typically include timers for timing out the exercise. However, these timers tend to hinder rather than help the situation in that they provide a reminder of the long and often unbearable time that is set for carrying out the exercise on the device.

SUMMARY OF THE PRESENT INVENTION

The present invention relates to controls for a video game to be played from an exercise device for substantially mitigating the mental boredom problems associated with exercising as described above. The arrangement of the present invention is one which provides time structuring during the exercise period so that the thought processes are not focussed on the exercise but rather on the game that is played through the exercise. This aspect of time structuring which has not been used with exercise equipment in the past is however found within different types of games such as tennis or the like where the participants totally forget about time while exercising to the utmost. In fact, people often play games like tennis for longer periods than initially intended.

More specifically, the present invention provides a video game control arrangement comprising manual controls for controlling player movement on a video screen and adapted for operation on the handlebars of an exercise device, on/off means for enabling and disabling the manual controls, selector means for setting a proposed exercise pace, detector means for detecting actual pace and comparator means for comparing the actual with the proposed pace. In this arrangement the on/off means is responsive to the comparator means to enable the manual controls with favourable comparison and to disable the manual controls with unfavourable comparison of the actual and proposed paces.

With this arrangement the video game is played from the exercise device and as anyone who has played the different types of video games will appreciate, the utmost attention is required to score effectively on the video games. Accordingly the person playing the game while on the exercise device tends to concentrate heavily on the video while forgetting about the exercising aspects of the game to provide a time structured environment.

BRIEF DISCUSSION OF THE DRAWINGS

The above as well as other advantages and features of the present invention will be described in greater detail according to the preferred embodiments of the present invention in which:

FIGS. 9 and 10 are perspective views of further actuating controls for arrangement of FIG. 1.

DETAILED DESCRIPTION ACCORDING TO THE PREFERRED EMBODIMENTS

There are different types of video games including a first game type such as tennis, hockey, etc. where two simulated paddles, one on either side of the screen move in an up and down direction for blocking the path of simulated ball or puck. In this type of game the player movement on the screen requires appropriate vertical positioning of the simulated paddle to provide an effective block.

Figure 1:
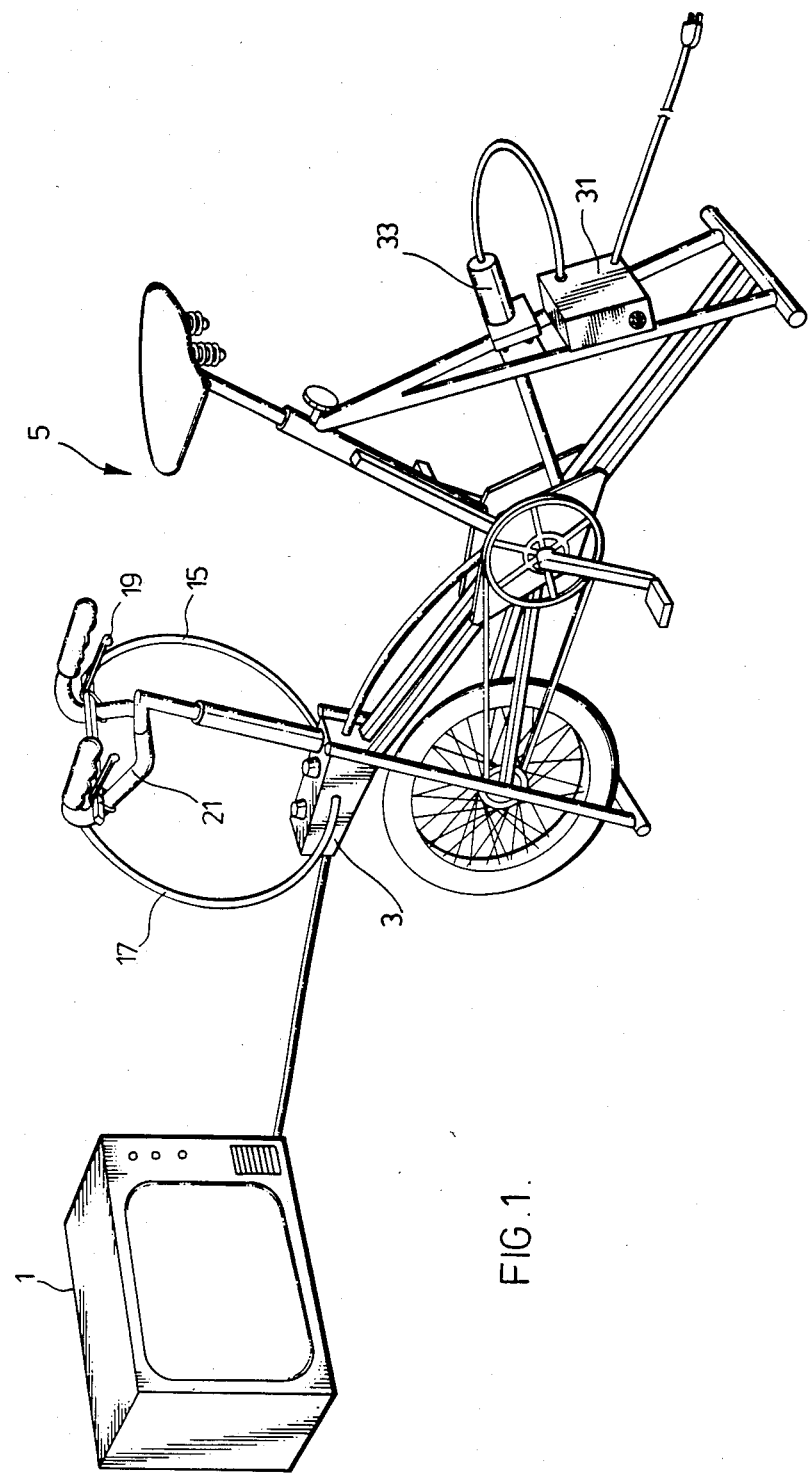
FIG. 1 is a perspective view of a combination exercise and video game playing arrangement according to a preferred embodiment of the present invention.

The arrangement shown in FIG. 1 is specifically set up for this first type of video game described above with vertically moveable paddles to either side of the screen. Movement of one of these paddles is controlled by a person on an exercise bike while movement of the other paddle is controlled by an alternate player.

Figure 6:
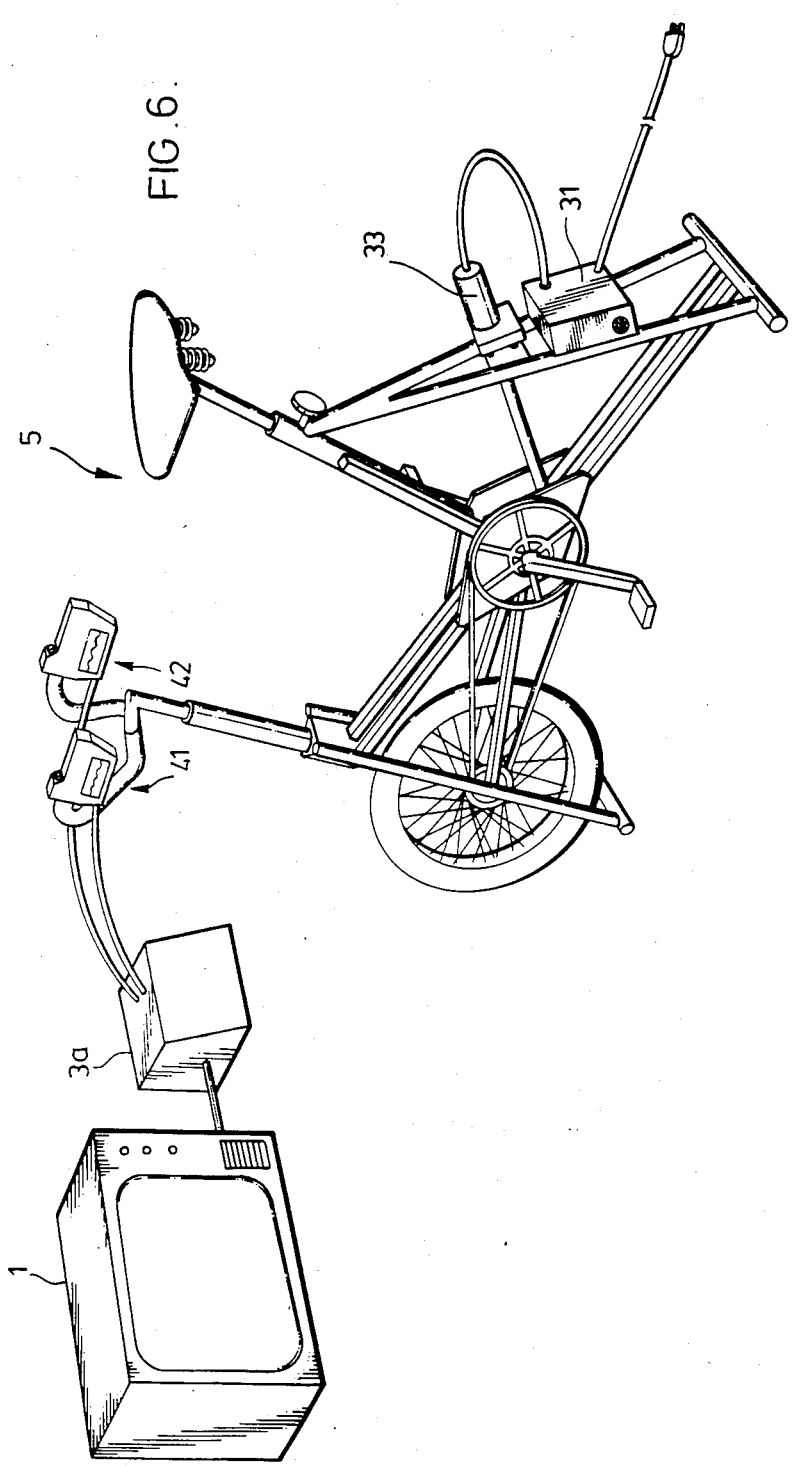
FIG. 6 is a perspective view of a game playing arrangement according to a further embodiment of the present invention.

In a second type of video game such as the new cartridge type games, player movement is controlled in both the up and down as well as the side to side direction across the screen. For example, player movement may be controlled through a maze of paths in all directions on the screen. An arrangement for this second type of game is shown in FIG. 6 to be described later in detail.

Figure 5:
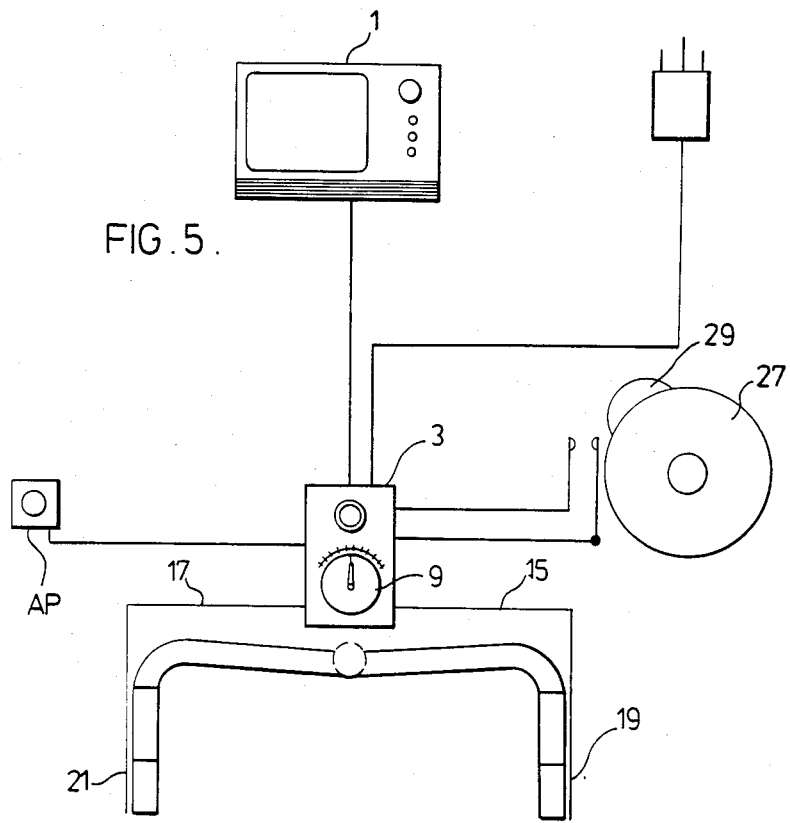
FIG. 5 is a schematic view showing the electrical connections of the arrangement of FIG. 1.

Returning to FIG. 1, this arrangement includes a TV video screen 1 hooked up to a video game 3 having a control 7 which is secured to and operated from an exercise bike 5. The wiring for the arrangement is best shown in FIG. 5 where an alternate player control AP is also wired into video game 3 so that two people can play the video game at one time with the one player being seated on the exercise bike and the alternate player playing from a different location. It should be noted that in FIG. 5 that the alternate player is hooked up to a conventional control, but could also be hooked up to a second exercise bike in the same manner as the arrangement shown in FIG. 1.

Figure 4:
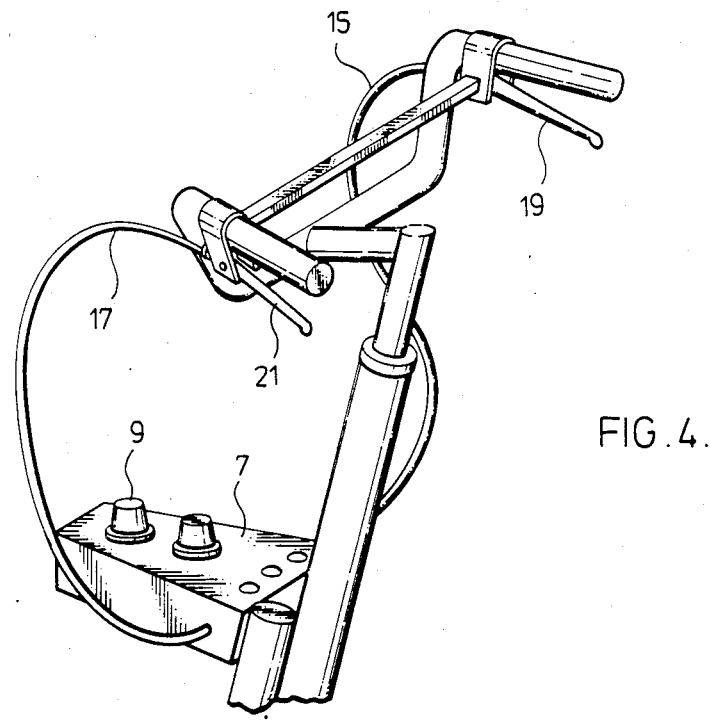
FIG. 4 is a perspective view showing the control device of FIG. 3 and the manual controls fitted to the exercise bike of FIG. 1.

In accordance with standard construction, player adjustment on TV screen 1 is controlled through a potentiometer. However in contrast to typical controls, control 7 of the present invention is provided with a unique construction for rotation of the potentiometer as shown in FIG. 4. More particularly a rack 13 includes a wire wrap around a potentiometer control 11 with a pair of cables 15 and 17 to either side of the rack for adjusting the potentiometer control position. These cables extend upwardly to a pair of hand or finger operated levers 19 and 21 on the handlebars which not only provide for balanced riding of the exercise bike but also provide for guiding the control of handle levers 19 and 21. Again, as anyone who has played these video games will appreciate, extreme accuracy is required in the movement of the players on the screen particularly when the ball or puck to be blocked is moving at high speed. Therefore the operation of the remote control hand levers must be extremely steady which in this particular embodiment is accomplished through the mounting of hand levers 19 and 21 directly beneath the hand rests on the handlebars so that the person playing the video game can not only ride the exercise bike but at the same time can, while holding on to the hand rests for steadying his or her position, operate the levers by simply resting the palm on the hand rests while reaching down with the fingers to control the up and down movement of levers 19 and 21.

The levers are operated alternately of one another whereby as one lever is pulled upwardly, rack 13 is pulled in the direction of that lever to operate the potentiometer control to move the paddle in a first direction. To move the paddle in the opposite direction the other lever is pulled upwardly while releasing the first lever to pull the rack in the opposite direction and to rotate the potentiometer control to move the paddle in the opposite direction.

Figure 3:
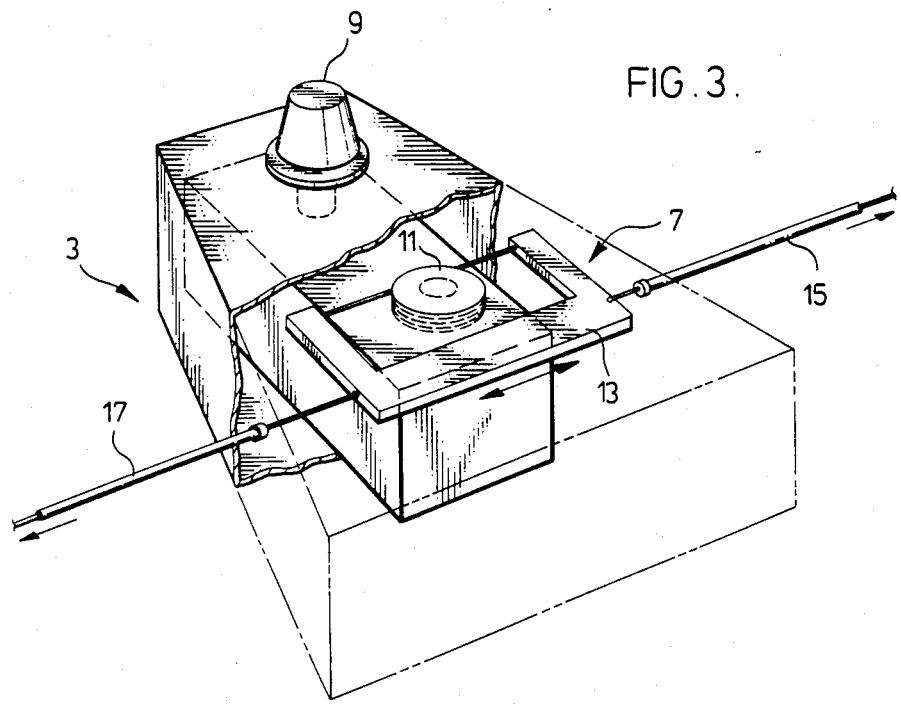
FIG. 3 is an enlarged partially sectioned perspective view of the player movement control device as used in FIG. 1.

FIG. 3 shows in greater detail the fitting of hand lever 19 to the handlebar of the bike. It is to be appreciated that hand lever 21 is fitted in the identical manner. According to this setup a spring mechanism 20 is provided for normally biasing the hand lever to an neutral position relative to the hand rest such that neither lever is effected by the spring on the other lever. The lever is closed by pulling up against the spring pressure and will automatically return to the open position through the spring mechanism as soon as the hand lever is released. In this particular embodiment the spring mechanism is replaceable with stiffer springs for adjusting the pressure of the spring mechanism. Accordingly lever 19 not only provides a control for player movement on the television screen through cable 15 to the remote control potentiometer but it additionally provides a hand exercise with an adjustable tension while riding the exercise bike.

Figure 2:
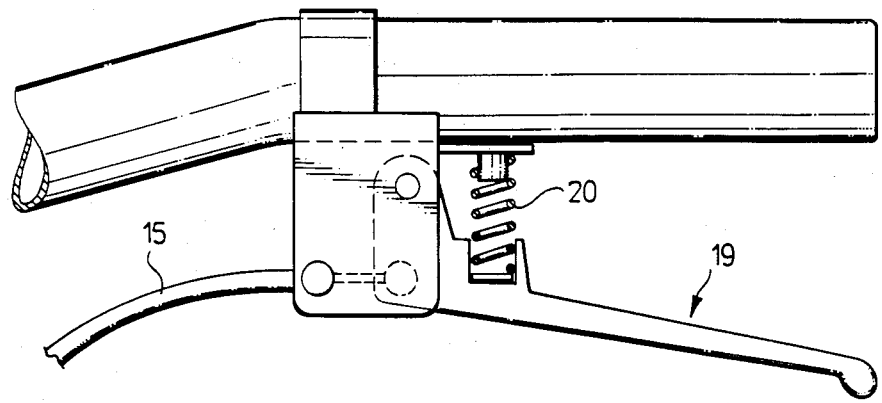
FIG. 2 is an enlarged side plan view of the manual controls for player movement on the video screen shown in FIG. 1.

FIGS. 9 and 10 show alternate arrangements for operating the control cables coming from the video game mounted to the bike. For example, in FIG. 9 the cables 15 and 17, rather than going to hand levers as shown in FIG. 2, extend upwardly to a handlebar arrangement generally indicated at 35 in which the handlebars themselves are adapted for rocking in an up and down motion to pull on one of the cables while pushing on the other cable. In this particular arrangement a sprng mechanism 37 is used for mounting the handlebars to the vertical post of the bike with this spring mechanism biasing the handlebars to a neutral position. The spring pressure on mechanism 37 is quite substantial so that the handlebars are not lose and sloppy and still provide a balancing effect on the bicycle. By pushing down on one side while pulling up on the other side of the handlebars the cables are maneouvered to operate the potentiometer control. As soon as the handlebars are released they will immediately return to the neutral position through spring mechanism 37.

FIG. 10 shows a slightly modified version of the control for video game 3. Here a handlebar arrangement generally indicated at 39 is provided in which the handlebars themselves are rotated in a horizontal plane for operation of cables 15 and 17 which are fitted through a cable mounting arrangement 41 to pull on one of the cables while pushing on the alternate cable. This arrangement may be provided with an internal spring mechanism for moving the handlebars to a neutral position as soon as all pressure is released from the handlebars.

According to both of the arrangements shown in FIGS. 9 and 10, substantial exercising of the shoulders and arms is provided while at the same time guiding cables 15 and 17 to adjust the player or paddle position on video screen 1.

The exercise and game playing arrangement of FIG. 1 is further characterized in that the potentiometer control is only activated for enabling controlled player movement on screen 1 when the exercise output from bike 5 matches a pre-established required output rate. At all other outputs from bike 5, the control for the player movement is disabled so that the alternate player is able to score at will thereby necessitating the player on the bike to meet the pre-established exercise output requirements.

More particularly a circuit in control 7 is provided with a retriggerable monostable multi-vibrator providing an output which keeps a relay energized for operation of the remote control. The retriggering of the multi-vibrator is accomplished by mounting a switch trip 29 on the hub 27 of the bicycle as shown in FIG. 6. With each revolution of the hub the multi-vibrator is retriggered to maintain the relay energized. The RC timing of the multi-vibrator is controlled by a potentiometer having an adjustment knob 9 with a scale for indicating the setting of the potentiometer. Accordingly if hub 27 is not rotated at an appropriate speed, the relay is de-energized by a control gate thereby disabling the controls making it impossible to guide player movement on screen 1.

Potentiometer control 9 can be set to require as low as a zero output from the exercise bike in which case no pedalling is required whatsoever to enable the hand controls. By setting control 9 at a higher level more exercising is required to enable the controls. However, it should also be noted that according to a preferred embodiment the player can in fact pedal too fast such that both under and over speed disables the controls. This is accomplished through the provision of a series of and gates and a timer which sense incoming pulses to determine whether the player is at an acceptable speed as set by potentiometer control 9 or is at a speed above or below that acceptable speed. If the player is on speed the controls remain enabled and if the player is off speed the controls are disabled.

A warning system is provided to indicate to the player when he or she is approaching a speed which will disable the controls. According to one embodiment a miniature traffic light is provided on the remote control box. This miniature traffic light includes a red light, a yellow light and a green light, all of which are activated by the pedal speed information fed to the control box. If the yellow light remains activated the player is pedalling at an acceptable speed. If the red light is activated the player is pedalling at an unacceptably fast speed whereas if the green light is activated the player is pedalling at an unacceptably low speed. This traffic light arrangement enables the player to then adjust the speed accordingly to maintain the controls energized.

By way of example the arrangement may be set up where an acceptable speed is 55 to 65 r.p.m.'s. At a speed of 55 to 57 r.p.m.'s the green light will come on and at a speed of 63 to 65 r.p.m.'s the red light will come on. In addition audible warnings can be provided to warn of over and under speeds.

As a further embodiment for warning the player that he or she is not pedalling at the appropriate speed the control box is set up to control the strength of the picture signal on the video screen. In this arrangement if the player is pedalling at an acceptable speed the video signal on the screen remains strong whereas the signal will tend to weaken if the player is pedalling at an over or an under speed.

In a further embodiment of the invention a torque adjustment is provided on bicycle 5 to vary the resistance to pedalling on the bicycle. If the torque is increased then the player must pedal harder to maintain the same pedal speed thereby increasing the exercise output from bike 5. If on the other hand the resistance to pedalling is decreased then less energy is required to maintain the same pedal speed.

According to the arrangement shown in FIG. 1 the torque adjustment is provided by means of a motor 33 which is operated from a programmer 31. The motor extends through the bike frame to a tensioning device wrapped around the hub of the bicycle and threaded back through the bike frame to the motor. Therefore, by rotating the shaft of the motor in one direction, the tensioning device is tightened around the hub whereas by rotating the motor shaft in the opposite direction the pressure of the tensioning device on the hub is decreased.

Programmer 31 is set at the beginning of a riding exercise to automatically adjust motor 33 for varying the resistance to pedalling at preset intervals. The programmer is in itself presettable to different timed out intervals to vary the control on motor 33.

Using the control enabling and disabling system described above with two bicycles set up for playing the video game, handicapping is provided in that each player selects his or her own speed and level of resistance via a standard torque adjustment on the exercise bike. If either of the two players do not meet the requirements for enabling their controls they will be unable to guide the paddle movement on the screen and therefore lose points to the opponent.

In FIG. 1 the video screen is shown as being remote from the exercise bike. However the video screen may be mounted directly to the exercise bike making it apparent that either setup is useable with the arrangement. It is also to be appreciated that the piece of exercise equipment need not be an exercise bike but could also be a stationary treadmill jogger or the like having hand rests to either side to receive for example, hand levers to guide the player movement on the video screen. Furthermore the game may be set up to control both video players from the exercise bike without requiring a playing partner.

The description above relates to the first type of video game in which the paddles are controlled to move typically in a vertical plane. The second type of video game shown in FIG. 6 is one in the players move both up and down and side to side and is also one in which the person exercising plays against the video device rather than another opponent.

In the FIG. 6 arrangement a video game 3a receives electrical signals from a pair of hand grips 41 and 42 which control vertical and horizontal player movement independently of one another. However other than the different direction control the two hand controls are identical to one another.

Figure 7:
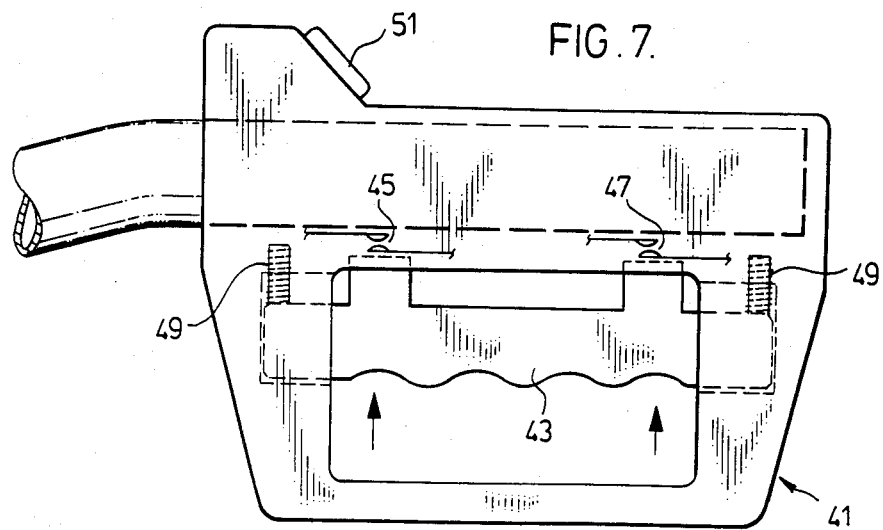
FIGS. 7 and 8 are side plan views of hand controls for the arrangement of FIG. 6.

Hand control 41, shown in FIG. 7, includes a moveable grip portion 43 which is spring loaded to a normally open position by means of springs 49. The grip is pulled upwardly against the pressure of springs 49 by again resting of the hand on the hand rest and reaching down with the fingers. In this embodiment a pair of contacts 45 and 47 are provided which cause up and down movement on the video screen. Contact 45 is at the forward end of the hand grip where pressure is exerted from the forefinger whereas contact 47 is at the back end of the hand grip where pressure is exerted by the rear fingers. Therefore by exerting more pressure on the forefinger, contact 45 is closed to cause player movement in one vertical direction on the screen and by exerting more pressure on the rear fingers, contact 47 is closed to cause player movement in the opposite vertical direction on the screen.

This particular handle does not use the mechanical cable arrangement as shown in FIG. 1 but uses an electrical connection to a control for the video game. Furthermore handle 41 is provided with a control button 51 which is used to shoot missiles and the like across the video screen as found in many cartridge type games.

Figure 8:
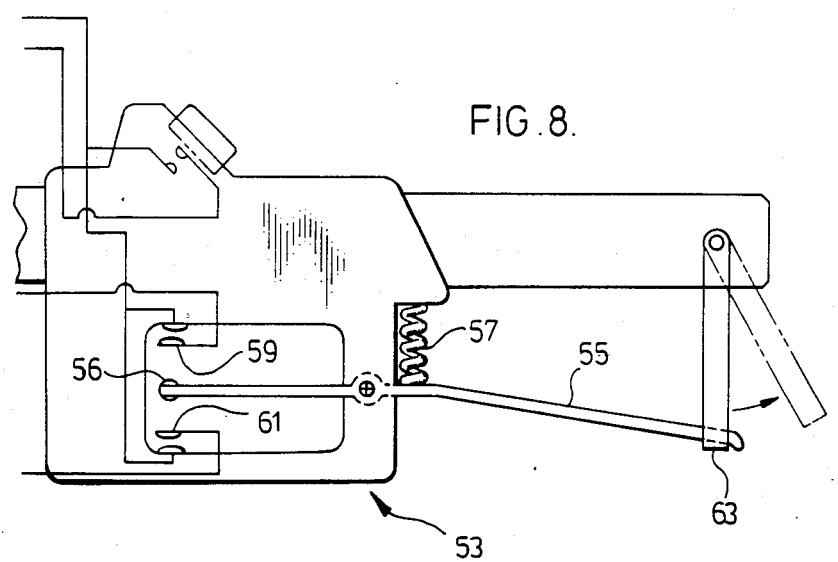

Hand control 53 shown in FIG. 8 again includes a hand lever 55 for operation of the control. Lever 55 is loaded by means of a spring 57 and is moveable at its one free end 56 between a pair of contacts 59 and 61. By pulling upwardly on the lever contact 61 is closed and by releasing the lever, contact 59 is closed through the pressure of spring 57. These contacts 59 and 61 again control player movement in either the up and down or side to side direction on the video screen.

In this embodiment a lock 63 is provided to lock lever 55 in a neutral position which would otherwise automatically move to a closed position with contact 59 under the pressure of spring 57. This lock which consists simply of a pivotal U-shaped member for engaging the outer end of lever 55 is quickly and easily released as shown in dotted lines in FIG. 7 to allow complete maneuvourability of the hand lever.

It will now be seen that various different preferred embodiments of the invention have been described above to allow the playing of a video game from an exercise device. The controls for the video game are mounted to the exercise device in a manner for balancing on the exercise device through hand positioning which also allows steady guided player movement on the video screen.

From an enjoyment standpoint the person using the exercise device will have to focus his or her concentration on the video game and will therefore forget about the fact that he or she is exercising. This tremendously relieves the boredom of the exercise which in most cases will be completely forgotten to properly concentrate on the video aspects of the arrangement.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A video game control arrangement comprising manually operated controls for controlling player movement on a video screen and mounting means for mounting said controls in a supported position on hand and arm rest suppoting means of an exercise device for manual operation of said controls with such manual operation being guided by the supporting means of the exercise device, said manually operated controls comprising hand grip members operating cables for controlling a potentiometer control for controlling player movement on the video screen.

2. A video game control arrangement as claimed in claim 1 wherein said hand grip members operate electrical switches for controlling player movement on the video screen.

3. A video game control arrangement as claimed in claim 1 wherein said manually operated controls comprise cables connected to the supporting means of the exercise device, the exercise device comprising an exercise bicycle with the supporting means comprising moveable handlebars on the exercise bicycle for operation of the cables to control player movement on the video screen.

4. A video game control arrangement for operation from the handlebars of an exercise device comprising individual hand pressure operated members mounted by mechanical means in a position beneath and using the handlebars as a stationary support for guiding operation of the hand pressure operated members to control player movement on a video screen, said arrangement including selector means for setting a proposed exercise pace, means for relating actual with the proposed exercise pace, on-off means for enabling said hand pressure operated members with favourable relation and disabling said hand pressure operated members with unfavourable relation of the actual and proposed paces, and a cable arrangement fitted to a potentiometer control device which is adjusted through movement of said hand pressure operated members to control the player movement in a single plane.

5. A video game control arrangement as claimed in claim 1 including a rack wrapped around said potentiometer control device for adjustment thereof through said hand pressure operated members.

6. A video game control arrangement as claimed in claim 4 wherein said manually operated controls operate electrical switches.

7. A video game control arrangement as claimed in claim 6 wherein said electrical switches control player movement in a multiple of planes.

8. A video game control arrangement as claimed in claim 7 including right and left hand controls for up/down and side to side player movement on the video screen.

* * * * *